Dec. 29, 1931.   C. S. BRAGG ET AL   1,838,803
BRAKE MECHANISM FOR AUTOMOTIVE VEHICLES
Original Filed May 19, 1925    2 Sheets-Sheet 1
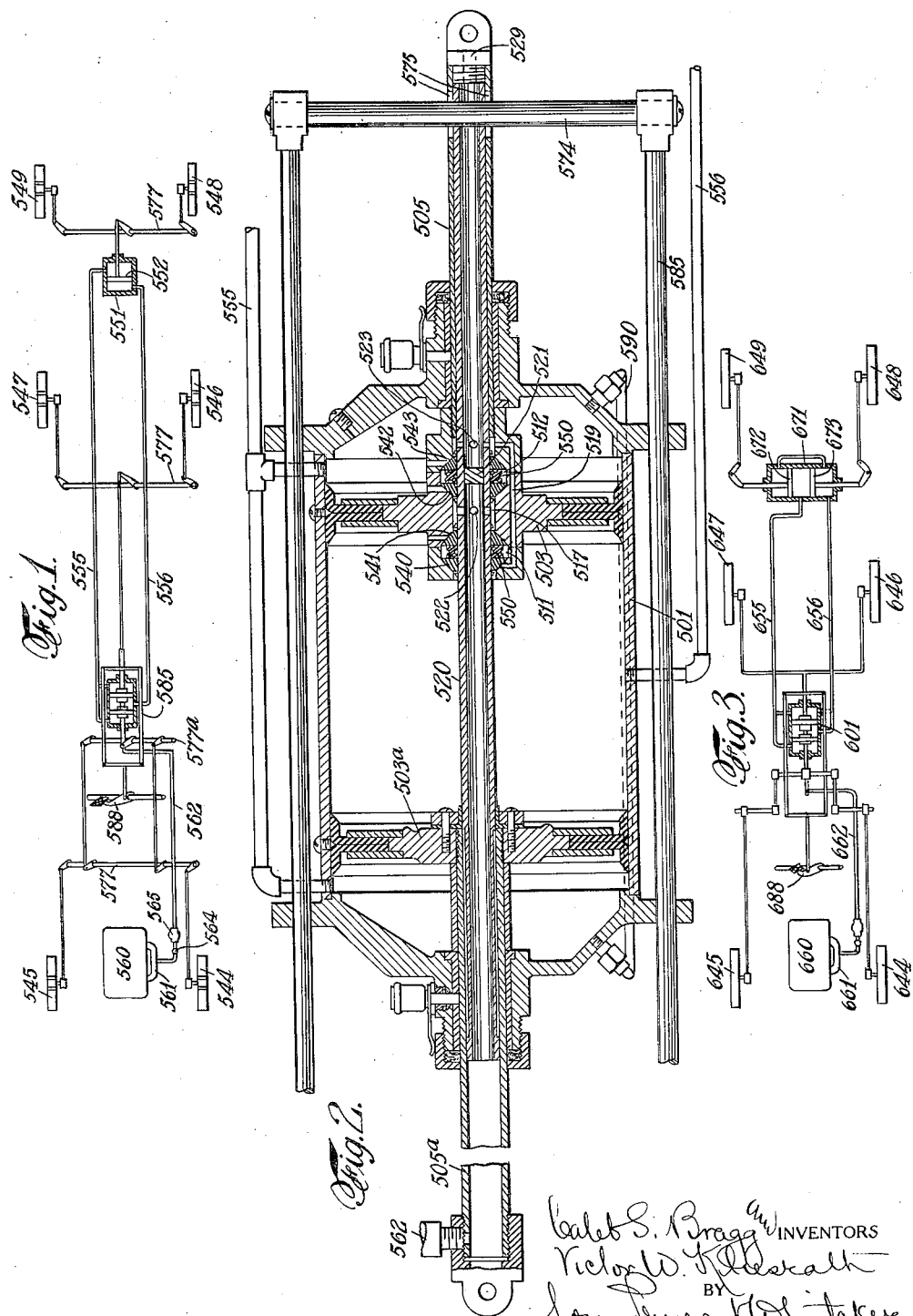

Dec. 29, 1931.     C. S. BRAGG ET AL     1,838,803
BRAKE MECHANISM FOR AUTOMOTIVE VEHICLES
Original Filed May 19, 1925    2 Sheets-Sheet 2
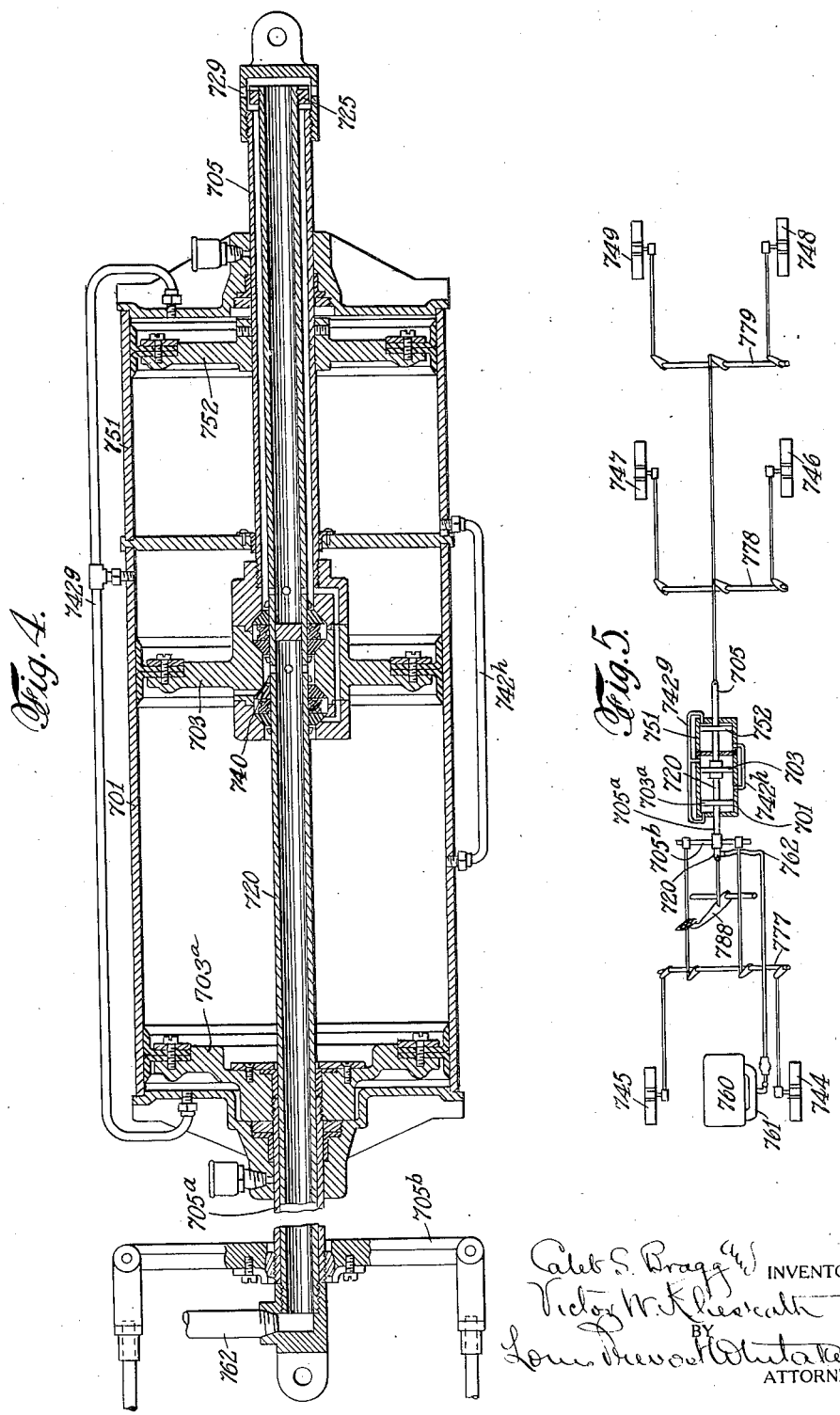

Patented Dec. 29, 1931

1,838,803

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Original application filed May 19, 1925, Serial No. 31,281. Divided and this application filed January 25, 1927, Serial No. 163,350. Renewed May 20, 1931.

Our invention consists in the novel features hereinafter described reference being had to the accompanying drawings, which illustrate several embodiments of the same, selected by us for purposes of illustration and the said invention is fully disclosed in the following description and claims.

This application is a division of our former application for Letters Patent of the United States, filed on or about May 19, 1925, and given Serial No. 31,281.

Our invention is an improvement in power actuated brake mechanism for vehicles, and is specially adapted for use with automotive vehicles propelled by an internal combustion engine, which in its normal operation, provides continually differential pressures, which can be availed for operating the power actuators employed in connection with the brake mechanism of the vehicle. Our present invention is especially adapted for operating the brake mechanism of heavy automotive vehicles, such as trucks and buses, in which the power required to apply all of the brake mechanism for the vehicle, which may have four, six, or even more wheels, is beyond the ordinary physical strength of the operator, and our present invention is also readily adaptable to installations in which a main automotive vehicle is provided with a trailing vehicle, or trailer, propelled by the main vehicle, so that the brake mechanism of both vehicles shall be under the control of the operator of the main vehicle.

According to our present invention we provide a main actuator comprising a cylinder and two pistons movable away from and toward each, under the control of one operator operated valve mechanism, preferably located in one of said pistons, each piston being connected to and operating different brake mechanisms of the vehicle, or vehicles, and in combination therewith we employ an auxiliary actuator (or actuators) which may be either of the single piston or double piston type, and are without valves, the auxiliary actuator cylinder being connected to the main actuator cylinder in such manner that the piston, or pistons thereof, is or are controlled by the valve mechanism of the main actuator to apply other brake mechanism, or mechanisms, all of which are controlled by the operator operated part. The operator operated part is operatively connected with a piston of the main actuator, and the brake mechanism connected therewith, by means permitting sufficient lost motion to insure the operation of the valve mechanism, from which it follows that the operator, when all the brake mechanisms are applied, can still add his physical force to the brake mechanism connected with the valve piston of the main actuator and can also operate that piston and the brake mechanism connected therewith in case of failure of power, for the purpose of preventing accidents.

Our invention also includes as a modification, the combination of an auxiliary actuator cylinder with the main actuator cylinder and the connection of one of the main actuator pistons and the auxiliary actuator piston to the same piston rod, which is in turn connected to a portion of the brake mechanism of the vehicle, or vehicles, in which case the operator may add his physical force to the brake mechanisms connected with said main and auxiliary connected pistons, and may also operate the brake mechanism connected therewith by physical force alone, in case of failure of power.

Referring to the accompanying drawings,

Fig. 1 is a diagrammatic view of an installation adapted especially for automotive vehicles provided with six wheels and having brake mechanism for all of said wheels, and embodying our invention, Fig. 2 is an enlarged sectional view showing the main actuator illustrated in Fig. 1.

Fig. 3 is a diagrammatic view somewhat similar to Fig. 1, in which the auxiliary actuator is provided with two pistons connected with different brake mechanisms.

Fig. 4 is an enlarged sectional view of a double piston on main actuator similar to that shown in Fig. 2, having an auxiliary actuator cylinder and piston structurally combined therewith, the piston of the auxiliary actuator being connected with the piston rod of one of the main actuator pistons.

Fig. 5 is a diagrammatic view similar to

Fig. 1, showing the main and auxiliary actuators illustrated in Fig. 4, installed in an automotive vehicle for operating six wheel brakes thereof.

Referring to the Fig. 1 of the drawings, which represents, diagrammatically, an installation in an automotive vehicle, in connection with the internal combustion engine and brake mechanism thereof, embodying our invention, 560, represents the internal combustion engine for propelling the vehicle provided with the usual suction passage for explosive charges, from the usual carburetor, a portion of the suction passage between the throttle valve and the engine cylinders, as the intake manifold, 561, being diagrammatically illustrated, and serving as the source of suction, as hereinafter described. The vehicle is indicated as having six wheels, each of which is provided with brake mechanism, the front wheel brakes being illustrated at 544, 545, the rear wheel brakes at 548 and 549, and the intermediate wheel brakes at 546 and 547. It is to be understood that the brake mechanism may be of any desired character, and connected in any suitable way for operation by the actuators hereinafter described. In the diagram, we have shown each pair of brakes connected by links with transverse rock shafts, indicated at 577, for securing the simultaneous application of each pair of brakes, in a well known way. The main actuator in this instance is a double acting piston actuator, of the type covered by our Letters Patent of the United States, No. 1,592,918 dated July 20, 1926, a sectional view of which is illustrated in Fig. 2. As the specific form of this duplex actuator forms no part of our present invention, it will not be particularly described beyond stating that it comprises a cylinder, 501, main piston, 503, provided with reversing valve mechanism, preferably located in the piston hub and controlled by a longitudinally movable valve sleeve, 520, having a limited amount of movement, or lost motion, with respect to the piston, the main piston rod, 505, extending through one head of the cylinder, and the cylinder being also provided with what we have termed a floating piston, 503$^a$, without valve mechanism, having a separate piston rod, 505$^a$, extending through the other head of the cylinder, the two end portions of the cylinder being connected by a by-pass, 590. The reversing valve mechanism is constructed to exhaust the air from the central portion of the cylinder, 501, by connecting said portion of the cylinder with the intake manifold of the engine, and admit air at atmospheric pressure to the end portions of the cylinder, to effect the movement of the pistons toward each other to apply the brake mechanisms connected with their respective piston rods, and to reverse these connections to return the pistons and connected brake mechanism to normal position.

In this instance the reversing valve mechanism comprises a suction chamber, 517, and two valve chambers, 511 and 512, each provided with a pair of oppositely disposed valves, 540, 541, 542 and 543, of which 541 and 542, are suction valves, and 540 and 543 are air inlet valves, said valves being preferably formed of molded rubber, and fitting the valve sleeve, 520, so as to make air tight connection therewith, while permitting the sleeve to move through them, said valves being yieldingly held seated by elastic seating means, indicated at 550, and located preferably between the valves of each pair, and the valve sleeve being provided with collars so arranged that a movement of the sleeve, 520, in either direction, will effect the opening of one suction valve and one air inlet valve. The sleeve is divided into two parts by a plug, 521, one portion of the sleeve communicating with the suction chamber through apertures, 522, and communicating with the hollow piston rod, 505$^a$, which is in turn connected by a suction pipe, 562, with the intake manifold, said pipe being preferably provided with a check valve, 565, and an adjustable restricting or regulating valve, 564, as indicated in Fig. 1. Air is admitted to the valve seats for the air inlet valves by means of an aperture, indicated at 529, in the end of the piston rod, 505, communicating with the interior of the sleeve, 520, on the opposite side of the plug, 521, from the suction chamber, and communicating by apertures, 523, and a by-pass, 519, with the apertures controlled by the air inlet valves. This valve mechanism forms no part of our present invention, and is merely described for the purpose of enabling the operation of the actuator to be understood.

The sleeve, 520, as shown in Fig. 2, is actuated by a frame, 585, operatively connected with the pivotal lever, 588, shown in Fig. 1. In this instance the main piston, 503, of the main actuator is connected to the rock shaft, 577, which is connected with the intermediate wheel brakes, 546 and 547, and the so-called floating piston, 503$^a$, and the main actuator is connected to an auxiliary rock shaft, 577$^a$, which is in turn connected by a suitable linkage with the rock shaft, 577, connected with the front wheel brake mechanisms, 544 and 545. In Fig. 1 we have shown at what would be the rear end of the chassis, an auxiliary actuator, indicated at 551, of the single piston type, the piston, 552, being connected with the rock shaft, 577, which controls the rear wheel brakes, 548, 549. The main actuator and auxiliary cylinders are connected by pipes so that the joint operation of the actuators can be obtained by the operation of the valve mechanism for the main actuator. In this instance the end portion of the main cylinder, 501, is connected to the auxiliary actuator cylinder, 551, on one side of the piston therein by means of pipe, 555, and the central portion of the main actuator cylinder between the pistons thereof is connected with the auxiliary actuator cylinder on the other side of the piston therein, by a pipe, 556, as indicated in Fig. 1.

In this form of installation the brakes of all the wheels may be substantially simultaneously applied and released by power under the control of the foot lever, and the controlling valve mechanism for the main actuator. In this instance the rear transverse bar, 574, of the frame, 585, extends through an aperture in the sleeve, 520, and engages longitudinal slots, 575, in the piston rod, 505, thus limiting the relative movement between the foot lever and valve sleeve, 520, and the main actuator piston, 503. When the brakes are applied by power, as before mentioned, the operator, by further pressing on the foot lever, 588, may apply his physical force to the piston, 503, and the intermediate wheel brake mechanism connected therewith, and he can also operate the brake mechanism for the intermediate wheels through this connection by physical force alone in case of failure of power.

In Fig. 3 we have shown another form of installation, also designed for a six wheel vehicle, in which the main actuator, 601, is of the type illustrated in Fig. 2, having one valved piston and one floating piston, the main piston of which is connected by a suitable linkage with the intermediate wheel brake mechanism, 646 and 647, and the floating piston is connected with the front wheel brake mechanism, 644 and 645, under the control of the pedal lever, 688, deriving its power from the intake manifold, 661, of the engine, 660, by the suction pipe, 662, as hereinbefore described. In connection with the double piston main actuator, we employ a double piston auxiliary actuator, 671, without valve mechanism, arranged transversely of the chassis, and having the pistons, 672, 673, connected respectively to the rear wheel brakes, 648 and 649, the necessary levers and linkage, for example, as shown, and the necessary pipe connections, 656 and 655, being employed for connecting the various portions of the main actuator cylinder with the corresponding portions of the auxiliary actuator cylinder, so as to effect the substantially simultaneous operation of all the actuators under the control of the main reversing valve mechanism. In this construction the operator can, by physical power, apply the intermediate wheel brake mechanism, on failure of power, or add his physical force thereto in addition to the actuator.

It is to be understood that our invention is readily adaptable to installations in which a trailing vehicle is connected to and propelled by the main automotive vehicle, in which case it is only necessary to install one or more auxiliary actuators on the trailing vehicle, and provide flexible portions in the pipe connections between the main and auxiliary actuators so as to enable the brake mechanisms with which the wheels of the trailing vehicle may be provided to be actuated simultaneously with those of the main vehicle, as will be readily understood.

Fig. 4 represents a main actuator of the style illustrated in Fig. 2, with a main and floating piston, combined structurally with an auxiliary valveless actuator, the piston of which is coaxial with the main actuator pistons and is secured to the piston rod with which the main piston of the main actuator is connected. In Fig. 5 we have shown an installation in which the form of main and auxiliary actuators illustrated in Fig. 4, is connected with the brake mechanism. Referring to these figures, 701, is the main cylinder, provided with a main piston, 703, and the floating piston, 703$^a$, the main piston rod being indicated at 705, and the piston rod connected with the floating piston being indicated at 705$^a$. The auxiliary cylinder, indicated at 751, is coaxial with the main cylinder, and connected therewith in a unitary structure, and the auxiliary piston, 752, is mounted on the main piston rod, 705. 720 represents the valve sleeve operating the valve mechanism in the hub of the main piston, 703, said valve mechanism being indicated as a whole at 740. The central portion of the main cylinder is connected to one end of the cylinder, 751, by a pipe, 742$^h$, the opposite ends of the main cylinder are connected together and to the outer end of the auxiliary cylinder by pipe, 742$^g$. The operation of this device will be just the same as that described with reference to Fig. 2, except that the operation of the main piston, 703, is assisted by the auxiliary piston, 752. As indicated in Fig. 5, this construction can be very advantageously arranged in a motor vehicle having six wheel brakes, in which instance the piston rod, 705$^a$, for the floating piston, 703$^a$, is connected by means of a yoke, 705$^b$, suitable links, and a rock shaft, 777, with the front wheel brakes, 744 and 745. The piston rod, 705, connected with the main piston, 703 and auxiliary piston, 752, are connected by suitable links to the rock shafts, 778 and 779, which are in turn connected with the intermediate wheel brakes, 746, 747 and the rear wheel brakes 748, 749, in the manner indicated in Fig. 5. In these figures, 762 represents the suction pipe connecting the valve sleeve, 720, with the intake manifold, 761, of the engine, 760. In the installation shown in Fig. 5, it will be noted that the forward wheel brakes are connected to the floating piston, while the four wheel brakes for the intermediate and rear wheels are connected with the main actuator piston and auxiliary actuator pistons, so as to be acted on by the force of both of said pistons, and the physical force of the operator may be applied to the intermediate and rear wheel brakes, in the manner previously described.

In Fig. 4 we have shown, for the purpose of accomplishing this result, the valve actuating sleeve, 720, provided at its outer end with a collar, 725, located in a terminal fitting on the piston rod and adapted to engage the end of the piston rod when moved in one direction, and the end of the recess in the fitting when moved in the opposite direction, thus limiting the amount of lost motion between the valve sleeve, 720, and the piston rod, 705, to which the pistons, 752 and 703 are connected as previously described.

What we claim and desire to secure by Letters Patent is:—

1. The combination with an automotive vehicle, and a plurality of brake mechanisms therefor, of a main power actuator comprising a cylinder, a main double acting piston therein, an auxiliary double acting piston in said cylinder, and means including reversing valve mechanism for establishing differential pressures in said cylinders on opposite faces of said pistons, said valve mechanism being constructed to hold said pistons in balanced condition in an interjacent position of said valve mechanism, said cylinder being provided with a tubular passage connecting its opposite end portions, and the pistons therein being movable toward and from each other, an auxiliary valveless actuator comprising a cylinder, and a double acting piston therein, tubular connections between the auxiliary actuator cylinder on opposite sides of the piston therein, with the corresponding portions of the main actuator cylinder, on opposite sides of the main piston of the main actuator, connections from each of said pistons to certain of said brake mechanisms, and an operator operated part connected with the reversing valve mechanism.

2. The combination with an automotive vehicle, and a plurality of brake mechanisms therefor, of a main power actuator comprising a cylinder, a main double acting piston therein, an auxiliary double acting piston in said cylinder, and means including reversing valve mechanism for establishing differential pressures in said cylinders on opposite faces of said pistons, said valve mechanism being constructed to hold said pistons in balanced condition in an interjacent position of said valve mechanism, said cylinder being provided with a tubular passage connecting its opposite end portions, and the pistons therein being movable toward and from each other, an auxiliary valveless actuator comprising a cylinder, and a double acting piston therein, tubular connections between the auxiliary actuator cylinder on opposite sides of the piston therein, with the corresponding portions of the main actuator cylinder, on opposite sides of the main piston of the main actuator, connections from each of said pistons to certain of said brake mechanisms, an operator operated part connected with the reversing valve mechanism, said operator operated part being connected with one of the pistons of the main actuator by means permitting sufficient lost motion to insure the operation of the valve mechanism, whereby the physical force of the operator may be applied to the brake mechanism connected with said piston in addition to the power of the actuator, and said piston and the brake mechanism connected therewith may be operated by the physical force of the operator alone in case of failure of power.

3. In brake mechanism for automotive vehicles provided with an internal combustion engine for propelling the same having a suction passage, and a plurality of brake mechanisms, of a main power actuator comprising a cylinder closed at both ends, a main double acting piston therein, an auxiliary double acting piston in said cylinder, reversing valve mechanism carried by said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder, a double acting piston therein, tubular connections between the auxiliary actuator cylinder on opposite sides of the piston therein with the corresponding portions of the main actuator cylinder on opposite sides of the main piston thereof, connections from each of said actuator pistons to certain of said brake mechanisms, and an operator operated part connected with the reversing valve mechanism.

4. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism carried by said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder, a double acting piston therein, tubular connections between the auxiliary actuator cylinder on opposite sides of the piston therein with the corresponding portions of the main actuator cylinder on opposite sides of the main piston thereof, connections from each of said actuator pistons to certain of said brake mechanisms, and an operator operated part connected with the reversing valve mechanism, and operative connections between the operator operated part and the main piston of the main actuator having a provision for lost motion sufficient to insure the actuation of the valve mechanism, whereby the operator may add his physical force to the main actuator piston and brake mechanism connected therewith and may actuate said main piston and the brakes connected therewith by his physical force alone in case of failure of power.

5. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism carried by said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder coaxial with and permanently united to the main actuator cylinder, and a double acting piston therein, a common piston rod for the main valved actuator piston and said auxiliary actuator piston, tubular connections from the auxiliary actuator cylinder on one side of the piston therein to the end portions of the main actuator cylinder, tubular connections between the auxiliary actuator cylinder on the other side of its piston and the portion of the main actuator cylinder between its pistons, a separate piston rod for the auxiliary piston of the main actuator, connections from each of said piston rods to certain of said brake mechanisms, and an operator operated part connected with the valve mechanism for the main main piston of the main actuator.

6. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism carried by said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder coaxial with and permanently united to the main actuator cylinder, and a double acting piston therein, a common piston rod for the main valved actuator piston and said auxiliary actuator piston, tubular connections from the auxiliary actuator cylinder on one side of the piston therein to the end portions of the main actuator cylinder, tubular connections between the auxiliary actuator cylinder on the other side of its piston and the portion of the main actuator cylinder between its pistons, a separate piston rod for the auxiliary piston of the main actuator, connections from each of said piston rods to certain of said brake mechanisms, and an operator operated part connected with the valve mechanism for the main piston of the main actuator, and operative connections between the operator operated part and the common piston rod for the piston of the main actuator and the piston of the auxiliary actuator, whereby the operator may add his physical force to that exerted by said pistons upon the brake mechanism connected therewith, and may actuate said brake mechanism by physical force alone in case of failure of power.

7. The combination with an automotive vehicle, and a plurality of brake mechanisms therefor, of a main power actuator comprising a cylinder, a main piston therein, an auxiliary piston in said cylinder, and means including reversing valve mechanism for establishing differential pressures in said cylinders on opposite faces of said pistons, said valve mechanism being constructed to hold said pistons in balanced condition in an interjacent position of said valve mechanism, said cylinder being provided with a tubular passage connecting its opposite end portions, and the pistons therein being movable toward and from each other, an auxiliary valveless actuator comprising a cylinder, and a piston therein, tubular connections between the auxiliary actuator cylinder on opposite sides of the piston therein, with the corresponding portions of the main actuator cylinder, on opposite sides of the main piston of the main actuator, connections from each of said pistons to certain of said brake mechanisms, and means connected with the valve mechanism for operating the same, said means being also connected with certain of the brake mechanisms.

8. In a brake mechanism for automotive vehicles provided with an internal combustion engine for propelling the same having a suction passage, and a plurality of brake mechanisms, of a main power actuator comprising a cylinder closed at both ends, a main double acting piston therein, an auxiliary double acting piston in said cylinder, reversing valve mechanism connected to said main double acting piston, the opposite ends of the said cylinder being connected with each other, and means for connecting the cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder, a double acting piston therein, tubular connections between the auxiliary actuator cylinder on opposite sides of the piston therein with the corresponding portions of the main actuator cylinder on opposite sides of the main piston thereof, connections from each of said actuator pistons to certain of said brake mechanisms, and an operator operated part connected with the reversing valve mechanism.

9. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism connected to said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanisms, and said pistons being movable toward and from each other, an auxiliary valveless actuator comprising a cylinder, a double acting piston therein, tubular connections between the auxiliary actuator cylinder on opposite sides of the piston therein with the corresponding portions of the main actuator cylinder on opposite sides of the main piston thereof, connections from each of said actuator pistons to certain of said brake mechanisms, and an operator operated part connected with the reversing valve mechanism, and operative connections between the operator operated part and the main piston of the main actuator having a provision for lost motion sufficient to insure the actuation of the valve mechanism, whereby the operator may add his physical force to the main actuator piston and brake mechanism connected therewith and may actuate said main piston and the brake mechanism connected therewith by his physical force alone in case of failure of power.

10. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism connected to said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder coaxial with and permanently united to the main actuator cylinder, and a double acting piston therein, a common piston rod for the main valved actuator piston and said auxiliary actuator piston, tubular connections from the auxiliary actuator cylinder on one side of the piston therein to the end portions of the main actuator cylinder on the other side of its piston and the portion of the main actuator cylinder between its pistons, a separate piston rod for the auxiliary piston of the main actuator, connections from each of said piston rods to certain of said brake mechanisms, and an operator operated part connected with the valve mechanism for the main piston of the main actuator.

11. In brake mechanism for automotive vehicles provided with an internal combustion engine for propelling the same, having a suction passage, and a plurality of brake mechanisms, of a main power actuator comprising a cylinder closed at both ends, a main double acting piston therein, an auxiliary double acting piston in said cylinder, reversing valve mechanism connected to said main double acting piston, the opposite ends of the said cylinder being connected with each other, and means for connecting said cylinder with the suction passage and with the atmosphere under the control of said valve mechanism, said valve mechanism being constructed to hold the pistons in balanced condition in an interjacent position of the valve mechanism, and said pistons being movable toward and from each other, an auxiliary valveless actuator comprising a cylinder coaxial with and permanently united to the main actuator cylinder, and a double acting piston therein, a common piston rod for the main valved actuator piston and said auxiliary actuator piston, tubular connections from the auxiliary actuator cylinder on one side of the piston therein to the end portions of the main actuator cylinder, tubular connections between the auxiliary actuator cylinder on the other side of its piston and the portion of the main actuator cylinder between its pistons, a separate piston rod for the auxiliary piston of the main actuator, connections from each of said piston rods to certain of said brake mechanisms, and an operator operated part connected with the valve mechanism for the main piston of the main actuator, and operative connections between the operator operated part and the common piston rod for the piston of the main actuator and the piston of the auxiliary actuator, whereby the operator may add his physical force to that exerted by said pistons upon the brake mechanism connected therewith, and may actuate said brake mechanism by physical force alone in case of failure of power.

In testimony whereof we affix our signatures.

CALEB S. BRAGG.
VICTOR W. KLIESRATH.